United States Patent [19]
Grabon

[11] Patent Number: 5,996,896
[45] Date of Patent: Dec. 7, 1999

[54] HAND-HELD PORTABLE DATA COLLECTION SYSTEM HAVING OPTICAL CONTROL LINK

[75] Inventor: Robert J. Grabon, Cedar Rapids, Iowa

[73] Assignee: Norand Corporation, Cedar Rapids, Iowa

[21] Appl. No.: 08/984,637

[22] Filed: Dec. 3, 1997

Related U.S. Application Data

[60] Provisional application No. 60/031,854, Dec. 5, 1996.

[51] Int. Cl.⁶ .................................................. G06K 7/10
[52] U.S. Cl. ............................. 235/472.02; 235/462.46; 235/462.47; 235/462.48
[58] Field of Search .................. 235/472.01, 472.02, 235/472.3, 462.43, 462.45, 462.46, 462.47, 462.48; 250/221, 214 PR

[56] References Cited

U.S. PATENT DOCUMENTS 5,189,291  2/1993  Siemiatkowski ................... 235/462.45
5,340,972  8/1994  Sandor ................................... 250/221
5,736,726  4/1998  VanHorn ............................ 235/462.46

Primary Examiner—F. L. Evans
Attorney, Agent, or Firm—Suiter & Associates PC

[57] ABSTRACT

A hand-held portable data collection system having an optical control link is described. A reflective sensor detects the actuation of a trigger by sensing when a cantilevered extension member of the trigger interposes the operational range of the sensor upon actuation of the trigger. The optical control link of the present invention may be utilized to provide a data communications link between a hand-held portable data terminal and a docking apparatus. The optical control link of the present invention may be further utilized as an optical character reader to read optically readable data files such as bar codes.

11 Claims, 2 Drawing Sheets

HAND-HELD PORTABLE DATA COLLECTION SYSTEM HAVING OPTICAL CONTROL LINK

RELATED APPLICATION

This application claims priority under 35 U.S.C. §119(e) based on U.S. provisional application Ser. No. 60/031,854 (Attorney Docket No. 38288P1), filed Dec. 5, 1996.

BACKGROUND OF THE INVENTION

The present invention relates generally to the field of hand-held portable data file readers, and more particularly to non-mechanical control mechanisms.

Hand-held portable data collection systems may typically utilize an optical data file reader having a bar code scanner or CCD reader to collect optically encoded information. A portable data collection terminal, for example, may include a laser scanner system which sweeps a laser beam lengthwise across a bar code in which information is encoded. The laser scanner system detects the varying intensity of the reflected light as the laser beam reflects off of the regions of varying light intensity of the bar code. The pattern of light intensity describes a numerical code from which the encoded information may be electronically extracted.

Typically, such scanner systems utilize a mechanical switch, such as a magnetic reed switch and magnet system, for controlling the scanner when the switch is actuated. However, such mechanical switches eventually wear out after repeated use and must be replaced. The failure of the scanning switch renders the apparatus inoperative until replaced, resulting in undesired downtime and repair costs. Thus, it would be desirable to provide a non-mechanical scanning control switch which would not wear out with increased repeated use.

SUMMARY OF THE INVENTION

Accordingly, it is an object of the present invention to provide a non-mechanical optical control link.

Another object is to provide a hand-held portable data terminal which utilizes the optical control link to control a data file reader within the data terminal.

It is yet another object to provide a hand-held portable data terminal including a handle having a data file reader control trigger which is non-mechanically actuated via an optical control link.

A further object is to provide a portable data collection system in which a hand-held portable data terminal may communicate with a terminal dock via optical control link.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DESCRIPTION OF THE PREFERRED EMBODIMENT

Reference will now be made in detail to the presently preferred embodiment of the invention, an example of which is illustrated in the accompanying drawings.

Figure 1:
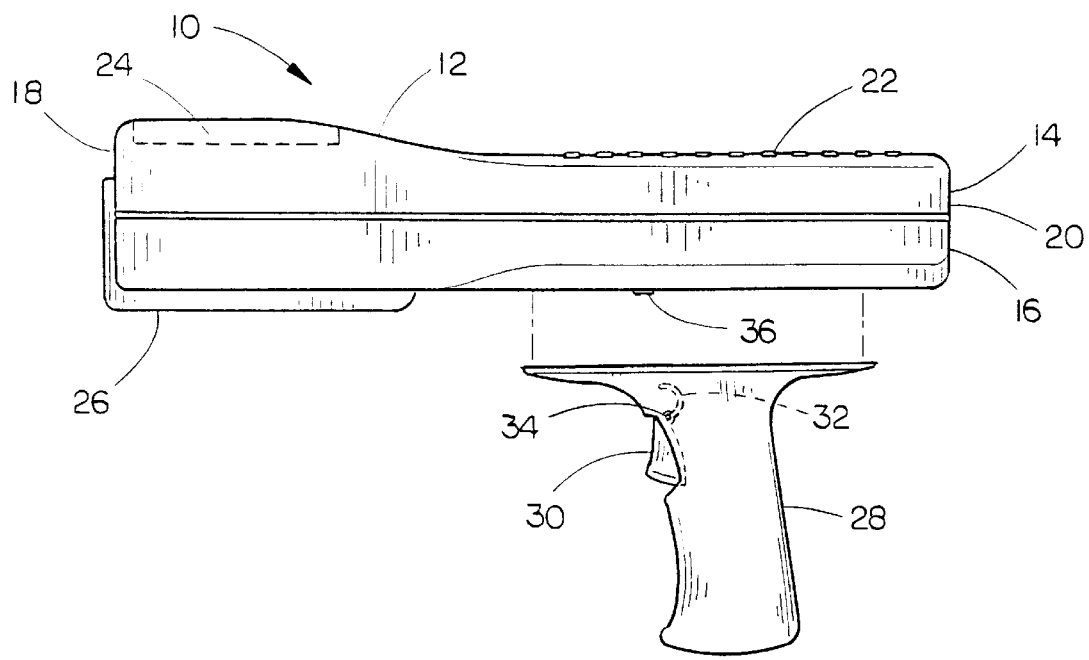
FIG. 1 is an illustration of the hand-held portable data collection system of the present invention.

Referring now to FIG. 1, a hand-held portable data collection system of the present invention is illustrated. The data collection system 10 preferably comprises a portable data collection terminal 12. The terminal 12 generally comprises an upper section 14, a lower section 16, a top end 18 and a bottom end 20. A keypad 22 may be disposed on the upper section 14 at the bottom end 20 for manual keying of data into the terminal 12. The terminal 12 preferably includes a display 24 disposed at the top end 18 on the upper section 14 for displaying user readable information. The terminal 12 further includes an optical reader 26 integrated with the terminal disposed at the top end 18 and generally on the lower surface 16 of the terminal 12. The optical reader 26 may utilize a laser bar code scanner or CCD array for optical character reading. Such a terminal is available from NORAND Corporation of Cedar Rapids, Iowa, for example the PEN*KEY 6400 hand-held PC mobile computer.

The terminal 12 is designed for hand-held operation and therefore may be operated in the palm of a user's hand by generally gripping the terminal 12 on the lower section 16 at the bottom end 20 opposite the keypad 22. The terminal 12 may utilize a removably attachable scanning handle 28 which is attachable to the lower section 16 of the data terminal 12 to facilitate pistol type scanning operation. The scanning handle includes a trigger actuator for actuating the optical character reader to control scanning or communications, for example. The trigger actuator 30 includes an extension member 32 disposed at one end and a pivot 34 for providing pivoting motion of the actuator and extension member. A reflective sensor 36 is disposed on the lower section 16 of the data terminal 12 which is disposed relative to the trigger actuator 30 and the extension member 32 to cooperatively sense the actuation of the trigger 30.

Figure 2:
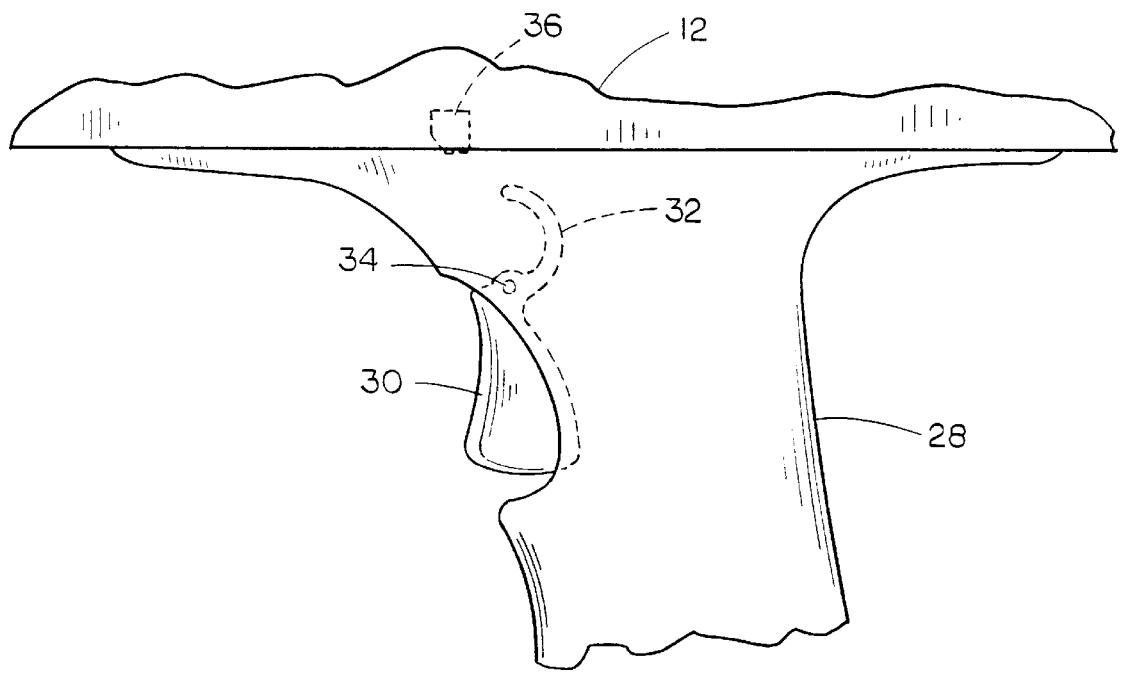
FIG. 2 is an illustration of a removably attachable scanning handle of the hand-held portable data collection system of FIG. 1.

Referring now to FIG. 2, the scanning handle 28 of FIG. 1 is shown. The scanning handle 28 includes the trigger 30 which includes extension member 32. The trigger 30 pivots about pivot 34 when depressed, causing extension member 32 to pivot about pivot 34 in response. In an exemplary embodiment, extension member 32 is curved in form in the direction of motion of extension member 32 when trigger 30 is depressed to facilitate the cantilever motion of extension member 32 about pivot 34. Extension member 32 is thereby caused to interpose the operating range of the reflective sensor 36 which emits a signal and detects the signal when reflected back to itself. When the trigger 30 is in a normal position, extension member 32 does not interpose the operating range of the reflective sensor 36, and the emitted signal is not reflected back to the sensor 36. When the trigger is in an actuated position, extension member 32 interposes the operating range of the reflective sensor 36 which detects a reflected signal. The trigger 30 includes position biasing means, e.g., a spring, for biasing the trigger 30 in the above described manner.

Figure 3:
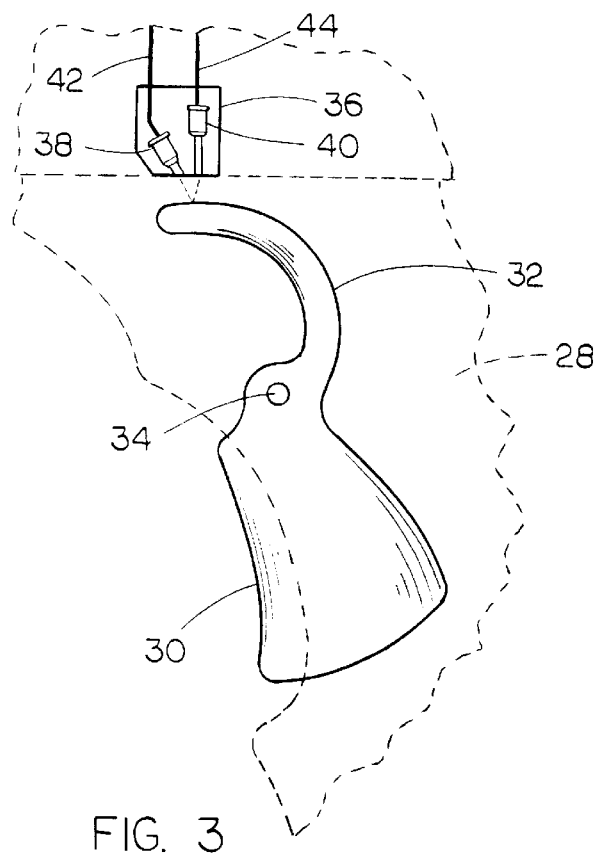
FIG. 3 is an operational illustration of the optical control link of the hand-held portable data collection system of FIG. 1.

Referring now to FIG. 3, the scanning handle of FIG. 1 is shown. The reflective sensor 36 generally comprises a phototransistor 38 and an infrared light emitting, or electroluminescent, diode (LED) 40. The phototransistor 38 is a transistor having an effective resistance that varies with the intensity of radiant light impinging thereon. Phototransistor 38 is packaged in a transparent or translucent package that allows radiant light to impinge upon the collector-base P-N junction. The effective conductivity of the base-collector junction increases in proportion to the intensity of the radiant light impinging thereon. Phototransistor 38 includes control lines 42 for controlling the operation thereof. Control lines 42 preferably include only a collector and emitter terminal as biasing of the base is not necessary. The LED 40 also includes control lines 44 for controlling the operation thereof. The LED 40 may emit infrared, visible, or ultraviolet light. A reflective sensor such as the type shown in FIG. 3 is available from OPTO TECHNOLOGY, Inc., of Wheeling, Ill., for example the OTO93168 reflective sensor.

Light from the LED 40 is radiated outward from the reflective sensor package 36. Radiant light emitted from the LED 40 may be reflected from a reflective surface back toward the reflective sensor 36. Radiant light reflected back at a predetermined angle of incidence impinges upon phototransistor 38, thereby varying the resistance of the transistor. The varying resistance of the phototransistor 38 may be detected via control lines 42 and provides a signal in response to the detected light. Thus, when extension member 32 interposes the operating range of the reflective sensor 36 while the trigger 30 is in an actuated position, light from LED 32 reflects off of extension member 32 and impinges upon phototransistor 38, thereby causing the phototransistor to have an effective resistance of a first value. When the trigger 30 is in an unactuated position, extension member 32 does not interpose the operating range of the reflective sensor, thus light emitted from LED 40 is not reflected back to phototransistor 38. Phototransistor 38 has effective resistance of a second value due to the absence of light from the LED 40. A control signal output is thereby provided by the reflective sensor which may be utilized to actuate and control the operation of the optical character scanner 26 of FIG. 2. The trigger 30, extension member 32 and reflective sensor 36 thereby operate as an optical control link. Because the control link is optical, physical switch contacts that would eventually wear out are not required.

Figure 4:
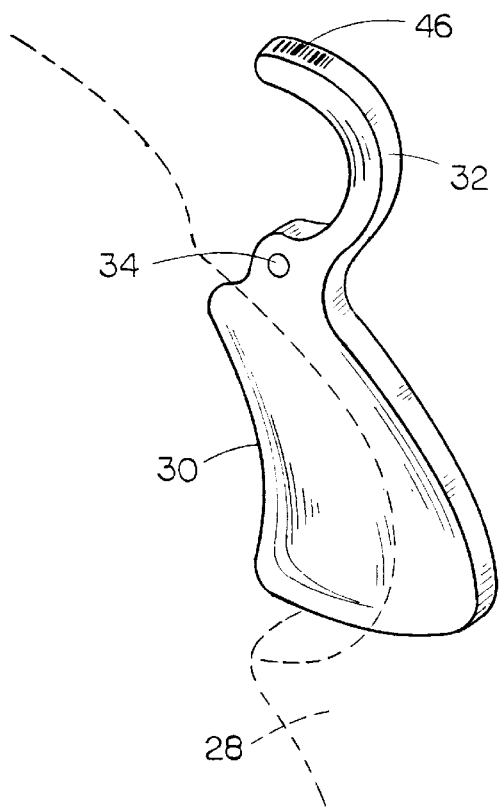
FIG. 4 is an illustration of the trigger mechanism of the scanning handle of the hand-held portable data collection system of FIG. 1.

Referring now to FIG. 4, the scanning handle of FIG. 1 is shown having additional control features. The trigger 30 of the scanning handle 28 may include a curvilinear extension member 32 which is capable of interposing the operational range of radiant light emitted from the reflective sensor 36 shown in FIG. 3. The extension member 32 may include a control region 46 having a pattern of varying light reflectivity which may be used to provide further control of the trigger 30. The control region 46 may be a bar code type pattern, for example, which will allow the reflective sensor 36 to detect the degree of actuation of the trigger 30. The degree of actuation of the trigger 30 may be determined by counting the number of times a region of non-light reflectivity, corresponding to a dark vertical bar, passes through the operational range of the reflective sensor 40. At each vertical bar, light is momentarily non-reflected from extension member 32 such that the resistance of the phototransistor varies accordingly with the pattern to produce a signal corresponding to the pattern of the control region. Thus, for example, when only a few bars of the control region 46 have been detected corresponding to a partial actuation of the trigger 30, the scanner 26 of FIG. 1 may be activated and produce an aiming beam. When more bars of the control region are subsequently detected corresponding to a full actuation of the trigger 30, scanning of an optically readable code may be thereby initiated by the scanner 26. In such an embodiment, actuation of the trigger 30 is capable of providing a greater amount of control through degree of actuation rather than merely providing two states of actuation.

Alternatively, in an embodiment not shown, the pattern of vertical bars in control region 46 may be replaced by a region having a graduated light reflectivity, ranging from a non- or lowly -reflective region which will be adjacent to sensor 36 when trigger 30 is in the unactuated position, which gradually changes to a highly reflective region which is adjacent to sensor 36 when trigger 30 is in the actuated position, and whereby scanner operation may be controlled as various threshold values of reflectivity, and thus, conductivity of photodiode 38, are reached.

Figure 5:
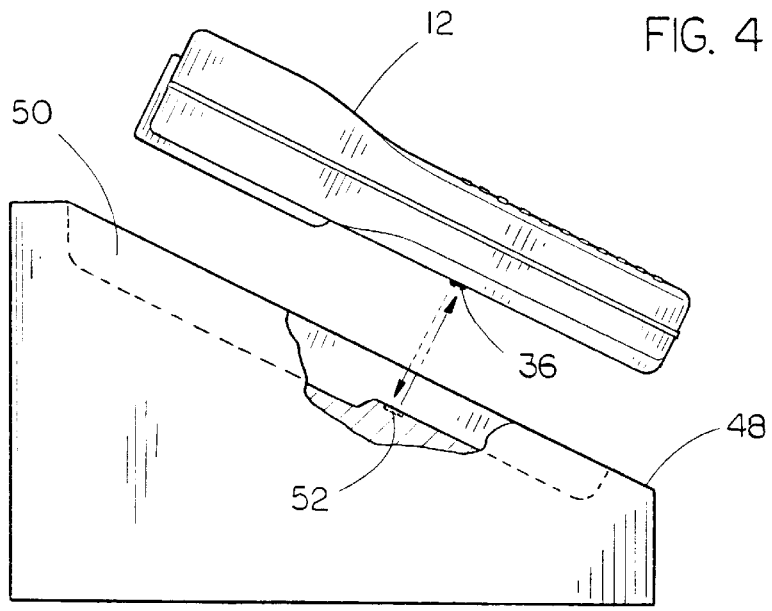
FIG. 5 is an illustration of the hand-held portable data collection system depicting the cooperation of a data collection terminal and a docking unit.

Referring now to FIG. 5, the hand-held portable data collection system of the present invention is shown including a docking apparatus for the data collection terminal. The docking apparatus 48 of FIG. 5 preferably includes a contoured region 50 to removably receive the hand-held portable data terminal 12. Among other functions such as battery charging, the docking apparatus includes a communicator interface 52 for communicating data between the docking apparatus 48 and the data terminal 12. The data terminal 12 may utilize the reflective sensor 36 to communicate with the communicator interface 52 via an optical link. The communicator interface 52 is preferably capable of interfacing with the reflective sensor 36 via an optical communications link and may likewise comprise a reflective sensor similar to the reflective sensor 36 of the data terminal 12.

Further, the reflective sensor 36 itself may function as an optical character reader for reading optically readable data files such as bar codes. The reflective sensor may be provided with the data terminal 12 in lieu of the optical character reader 26 of FIG. 1, for example. The reflective sensor 36 may operate to read an optically readable data file in a manner similar to the detecting of the pattern of varying light reflectivity of the control region 46 as depicted in the description of FIG. 4. The operation of the reflective sensor 36 as an optical control link for a scanning handle or as an optical character reader may be controlled for example by software programming.

It is believed that the hand-held portable data collection system having an optical control link of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:
1. A portable data collection system, comprising:
 (a) a hand-held data terminal;
 (b) an optical data file reader operably disposed within said hand-held data terminal, said optical data file reader for reading optical data files;
 (c) a reflective sensor operably disposed within said hand-held data terminal, said reflective sensor for trans- mitting and detecting reflections of transmitted waves and providing a control signal in response thereto, said control signal being provided to said optical data file reader for controlling the operation thereof;

(d) a handle removably attached to said hand-held data terminal, said handle for facilitating the operation of said optical data file reader; and (e) a trigger assembly movably attached to said handle, said trigger assembly for controlling the activation of said optical data file reader, said trigger assembly comprising a control region operable to reflect the transmitted waves of said reflective sensor when actuated, said control region comprising a pattern of varying reflectivity operable to allow said reflective sensor to detect the degree of actuation of said trigger assembly.

2. A portable data collection system of claim 1, wherein said pattern of varying reflectivity comprises a plurality of alternating light and dark regions.

3. A portable data collection system of claim 1, wherein said pattern of varying reflectivity comprises a region having a graduated light reflectivity.

4. The portable data collection system of claim 1, further comprising a terminal dock for removably receiving said hand-held data terminal, said terminal dock having a data port for providing a data communications link between said terminal dock and said hand-held data terminal, said data port operably coupling with said reflective sensor.

5. A method of operating an optical data file reader, comprising the steps of:

(a) providing an optical data file reader capable of reading an optical data file;

(b) providing a trigger assembly for the actuation of the optical data file reader, said trigger assembly comprising a light source, a photosensor, a lever which is moveable to a plurality of positions, and a control region moveably attached to said lever, said control region operable to reflect transmitted waves of said light source when actuated, said control region comprising a pattern of varying reflectivity operable to allow said photosensor to detect the degree of actuation of said trigger assembly;

(c) moving the optical data file reader and the optical data file relative to each other to bring the optical data file reader within operational range for reading the optical data file;

(d) actuating said trigger assembly, wherein actuation of said trigger assembly positions the control region such that light from said light source will be reflected upon said photosensor, and wherein changes in conductivity of said photosensor provide a control signal to operate said optical data file reader;

(e) detecting a first degree of actuation and initiating a first control function of the optical data file reader in response thereto; and (f) detecting a second degree of actuation and initiating a second control function of the optical data file reader in response thereto.

6. A method of claim 5, wherein said pattern of varying reflectivity comprises a plurality of alternating light and dark regions.

7. A method of claim 5, wherein said pattern of varying reflectivity comprises a region having a graduated light reflectivity.

8. A method of claim 5, wherein said step of initiating a first control function of the optical data file reader comprises producing an aiming beam.

9. A method of claim 8, wherein said step of initiating a second control function of the optical data file reader comprises scanning said optical data file.

10. A method of claim 5, wherein said step of initiating a second control function of the optical data file reader comprises scanning said optical data file.

11. A method of reading an optical data file, comprising the steps of:

(a) providing an optical data file reader capable of reading an optical data file;

(b) providing a trigger assembly for the actuation of the optical data file reader, said trigger assembly comprising a light source, a photosensor, a lever which is moveable to a plurality of positions, and a control region moveably attached to said lever, said control region operable to reflect transmitted waves of said light source when actuated, said control region comprising a pattern of varying reflectivity operable to allow said photosensor to detect the degree of actuation of said trigger assembly;

(c) moving the optical data file reader and the optical data file relative to each other to bring the optical data file reader within operational range for reading the optical data file;

(d) actuating said trigger assembly, wherein actuation of said trigger assembly positions the control region such that light from said light source will be reflected upon said photosensor, and wherein changes in conductivity of said photosensor provide a control signal to operate said optical data file reader;

(e) detecting a first degree of actuation and initiating a first control function of the optical data file reader in response thereto;

(f) detecting a second degree of actuation and initiating a second control function of the optical data file reader in response thereto; and (g) reading said optical data file.

* * * * *